Figure 3:
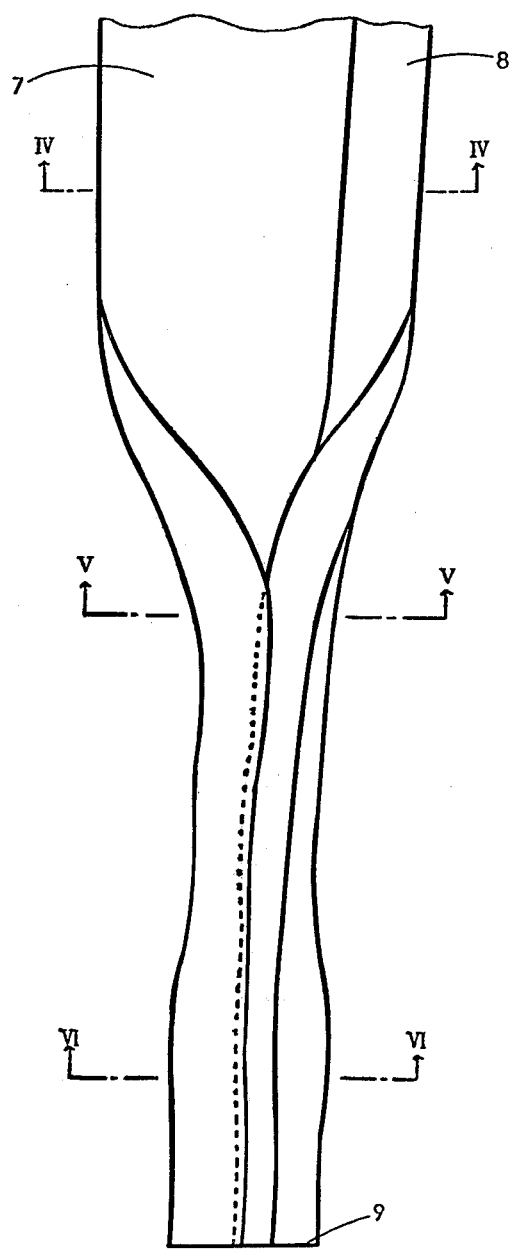
Figure 4:
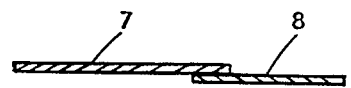
Figure 5:
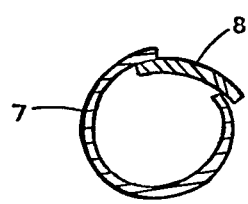
Figure 6:
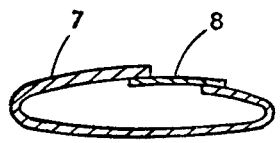

United States Patent [19]

Kitamura et al.

[11] 4,311,477
[45] Jan. 19, 1982

[54] BAG FOR CULTIVATING MUSHROOMS

[75] Inventors: Ryutaro Kitamura, Kashihara; Hirotsugu Masubayashi, Kobe, both of Japan

[73] Assignee: Polyplastics Company, Ltd., Osaka, Japan

[21] Appl. No.: 106,955

[22] Filed: Dec. 26, 1979

[51] Int. Cl.³ .............................................. A01G 1/04
[52] U.S. Cl. ...................................... 493/195; 47/1.1; 206/439; 493/381; 493/941
[58] Field of Search .......................... 47/1.1; 206/439; 493/195, 210, 213, 224, 381, 941

[56] References Cited

U.S. PATENT DOCUMENTS

| 2,851,821 | 9/1958 | Guiochon | 47/1.1 |
| 3,229,813 | 1/1966 | Crowe, Jr. et al. | 206/63.2 |
| 3,468,471 | 9/1969 | Linder | 229/62.5 |
| 3,938,658 | 2/1976 | Rohde | 206/439 |
| 4,027,427 | 6/1977 | Stoller et al. | 47/1.1 |
| 4,057,144 | 10/1977 | Schuster | 206/439 |
| 4,063,383 | 12/1977 | Green | 47/1.1 |

FOREIGN PATENT DOCUMENTS

| 939905 | 1/1974 | Canada | 47/77 |
| 1176188 | 1/1970 | United Kingdom | 47/1.1 |
| 1512050 | 9/1974 | United Kingdom . | |
| 1366777 | 5/1978 | United Kingdom . | |

*Primary Examiner*—Robert E. Bagwill
*Attorney, Agent, or Firm*—Robert J. Blanke

[57] ABSTRACT

A bag for cultivating mushrooms constructed at least in part from a microporous film which has gas-permeability but does not pass bacteria and infectious microbes.

3 Claims, 6 Drawing Figures

FIG. 1
FIG. 2
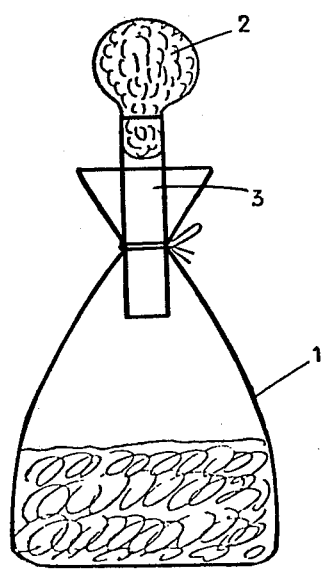
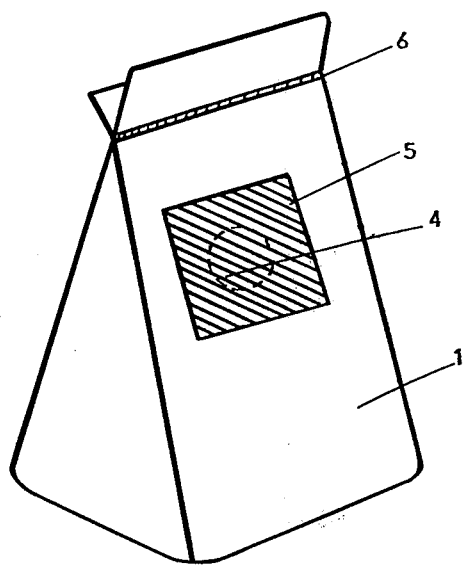

4,311,477

BAG FOR CULTIVATING MUSHROOMS

THE INVENTION

The present invention relates to a novel air-permeable bag which is suitable as a bag used for the fungus bed cultivation of mushrooms.

Heretofore, mushrooms have been cultivated on a wood cultivation media such as Quercus serrata, Quercus gladulifera, etc. Recently, however, fungus bed cultivation which is shorter in cultivation period has come to be extensively carried out. In case of fungus bed cultivation, a method employing a bag of plastic film has also come to be broadly carried out. As for the current cultivation method by means of a bag, a method has been employed wherein a plastic pipe having a cotton plug applied to the upper end thereof is inserted into the mouth of a bag of a plastic film, and then the mouth is bound, whereby air-permeability is obtained through the cotton plug.

However, this method employing the cotton plug has the following drawbacks:

(1) a considerable skill is required to apply the cotton plug;

(2) infectious microbes intrude through the cotton plug or into the area where the plastic pipe has been bound, to cause 20–30 % of rejects; and (3) the special cotton employed for the plug has become increasingly difficult to obtain.

In accordance with the present invention, an improved bag for cultivating mushrooms has been discovered wherein the above-mentioned drawbacks of prior art mushroom cultivating devices are overcome by employing a bag having an air-permeability afforded by constructing at least a part thereof with a porous film which has a gas-permeability but does not pass bacteria and infectious microbes.

A better understanding of the invention may be had from the drawings wherein:

Turning to FIG. 1, a mushroom cultivation bag representative of the prior art is set forth wherein a plastic pipe 3 having a cotton plug 2 applied to the upper end thereof is inserted into the mouth of a bag 1 of a plastic film. When the mouth of the bag is suitably bound to the plastic pipe 3, air-permeability is obtained through the cotton plug 2.

In contradistinction to prior art devices, FIG. 2 of the drawings illustrates a cross-sectional view of one form of the mushroom cultivation bag of the instant invention wherein a porous film 5 is applied around a hole 4 of a bag 1 by means of thermal adhesion or other suitable adhesive. The nozzle of the bag may be sealed by means of thermal adhesion at point 6 or, alternatively, by means of a simple binding procedure. As can be seen in FIG. 2, the illustration is that of a mushroom cultivation bag which has been processed and is in its sealed condition.

FIGS. 3 to 6 of the drawings illustrate an alternative means for producing a mushroom cultivation bag in accordance with the instant invention. More specifically, as can be seen in FIG. 3, a porous continuous film 8 is adhered to one edge of a nonporous continuous film 7, the juncture of porous continuous film member 8 and nonporous continuous film member 7 being better illustrated in FIG. 4, which is a cross-sectional view taken along the line IV–IV of FIG. 3 of the drawings. The sealed film section is then folded on itself so as to produce a tubular configuration, the tubular configuration being set forth in FIG. 5 of the drawings, which is a cross-sectional view taken along the line V—V of FIG. 3 of the drawings. The tubular configuration is then secured by once more heat sealing one edge of porous film member 8 to nonporous film member 7, the sealed configuration being set forth in FIG. 6 of the drawings, which is a cross-sectional view taken along the line VI—VI of FIG. 3 of the drawings. The resultant tubular product may then be cut into suitable lengths and heat sealed at one end so as to produce a bag member suitable for the cultivation of mushrooms.

The porous film employed in the present invention can be prepared according to various known methods, and as for such methods the following ones are enumerated:

A method wherein a to-be-dissolved-out substance is admixed to form a thin film, and thereafter said to-be-dissolved-out substance is admixed to form a thin film, and thereafter said to-be-dissolved-out substance is dissolved out of said film to form micropores therein; a method wherein a liquid functioning as a non-solvent to polymer is employed as a coagulating agent; a method wherein a synthetic resin solution containing a synthetic resin, a solvent and a non-solvent is freed of said solvent and thereafter freed of said non-solvent to form micropores; a method wherein a substance originally containing micropores is admixed with a polymer to form a microporous product; a method wherein polymer particles are sintered to form voids as micropores within the polymer particles; a method wherein a film is irradiated by radiation to injure a part of the film, which is then dissolved away to form micropores; a method wherein a swellable substance in a swelled state is mixed into a polymer and thereafter the resulting mixture is dried to form voids as micropores through volume shrinkage; a method wherein a film of a crystalline polymer is stretched under definite conditions to develop a lamella structure and thereafter thermal set is carried out in the state where a suitable elongation deformation has been imparted, to generate microvoids; a method wherein a film prepared from a polymer having an inorganic substance or the like of fine powder added thereto is stretched to form micropores; a method wherein thin fibers of about several microns are melt-blown to form a sheet having micropores; etc.

As for the porous film employed in the present invention, films having polymers brought into a porous state according to various methods as mentioned above are employed, and as such films, those of polyolefins such as polyethylene, polypropylene and the like, polycarbonates, polyamides, vinyl polymers, cellulosic polymers, fluorine-containing polymers or the like, are enumerated. Preferably, a microporous polypropylene film such as that film set forth in U.S. Pat. No. 3,679,538 issued July 25, 1972 is employed. Most preferably, the film is a polypropylene film with is 1 mil thick, 45% pore volume with oblong pores approximately 0.04×0.2 micrometers. This film may also be reinforced by lamination with a polypropylene web. It should be understood, however, that any of the aforementioned porous films must have a pore size capable of preventing contamination through intrusion of bacteria or infectious microbes. A pore diameter of $0.01$–$0.4\mu$ is particularly preferable, but it does not matter even if the diameter is in the range of $0.01$–$1\mu$, and in case of meandering pores, even if the diameter is about $10\mu$, the object is attained.

An example of the present invention will be illustrated below.

EXAMPLE 1

A circular opening port of 4 cm. in diameter was provided in a polypropylene bag having a width of 20 cm., a depth of 12 cm. and a height of 36 cm., the port being positioned about 15 cm. from the bottom part of the bag. "CELGARD" 4510 (registered trademark of Celanese Corporation for a product identified as a heat embossed laminate of a microporous polypropylene film bonded to a nonwoven polypropylene web) was applied over the port by means of heat seal to prepare a cultivation bag. A culture (2500 cc.) obtained by mixing sawdust of a broad leaved tree with rice bran in a mixing ratio of volume of 10:1 and adjusting the water content to about 68% was filled in each of 100 bags obtained as above, and thereafter sterilization was carried out at 120 degrees C. for one hour. After the temperature within the sterilized bags reached 30 degrees C. or lower, a seed fungus of Pholiota Mutabilis was inoculated into the culture, and the upper part of the bags was sealed. Natural cultivation was carried out at 7 degrees C. to 20 degrees C. to obtain a harvest. The same operation was carried out with cultivation bags employing a conventional cotton plug. In case where "CELGARD" 4510 was employed, no contamination brought by infectious microbes was observed, whereas, in case where cotton plug was employed, it was observed that 25 bags among 100 bags were contaminated.

Having thus disclosed the invention, what is claimed is:

1. A process for the preparation of a bag suitable for cultivating mushrooms, said process comprising sealing a continuous strip of non-porous film to a continuous strip of polypropylene microporous film reinforced with a non-woven polypropylene web, longitudinally folding the bicomponent sealed strip on itself and sealing the ends thereof, so as to form a continuous tube, cutting said tube into sealable lengths and sealing one end of each of said lengths.

2. The process of claim 1 wherein said non-porous film is polypropylene film.

3. The process of claim 1 wherein said sealing operations are heat-sealing operations.

* * * * *